(12) United States Patent  (10) Patent No.: US 7,798,796 B2
Lupke et al.  (45) Date of Patent: Sep. 21, 2010

(54) PIPE EXTRUDING SYSTEM WITH COOLING PLUG SEPARATION

(76) Inventors: Manfred A. A. Lupke, c/o Corma Inc., 10 McCleary Court, Concord, ON (CA) L4L2Z3; Stefan A. Lupke, c/o Corma Inc., 10 McCleary Court, Concord, ON (CA) L4L2Z3

( * ) Notice: Subject to any disclaimer, the term of this patent is extended or adjusted under 35 U.S.C. 154(b) by 0 days.

(21) Appl. No.: 12/289,057

(22) Filed: Oct. 20, 2008

(65) Prior Publication Data
US 2009/0102084 A1  Apr. 23, 2009

(30) Foreign Application Priority Data
Oct. 22, 2007 (CA) .................................... 2607517

(51) Int. Cl.
*B29C 47/92* (2006.01)
(52) U.S. Cl. .................... 425/113; 425/326.1; 425/393; 425/396; 425/378.1; 425/233
(58) Field of Classification Search ................ 425/113, 425/326.1, 393, 396, 336, 192 R, 378.1, 131.1, 425/143, 384, 369, 233, 180, 185, 136
See application file for complete search history.

(56) References Cited
U.S. PATENT DOCUMENTS

| | | | |
|---|---|---|---|
| 2,987,765 A | 6/1961 | Cichelli | |
| 3,364,524 A | 1/1968 | Hsia | |
| 4,770,618 A * | 9/1988 | Lupke | ........................ 425/72.1 |
| 5,007,817 A * | 4/1991 | Wallis | ........................ 425/136 |
| 5,296,188 A | 3/1994 | Lupke | |
| 2006/0040010 A1* | 2/2006 | Steiner | .................... 425/192 R |
| 2006/0068051 A1* | 3/2006 | Sheets et al. | ................. 425/190 |

FOREIGN PATENT DOCUMENTS

| | | |
|---|---|---|
| CA | 2588058AA | 8/2008 |
| WO | WO 94/09964 A1 | 5/1994 |

* cited by examiner

*Primary Examiner*—Kat Wyrozebski
*Assistant Examiner*—Xue Liu

(57) ABSTRACT

The pipe molding system includes a separable cooling plug and an automatic procedure to alleviate problems associated with excess plastic continuing to extrude after a sudden shutdown of the extrusion system. The separable cooling plug and shutdown procedure includes accommodating any excess plastic in a created void between the cooling plug and the extruder. This arrangement simplifies removal of the excess plastic and reduces the time required to return the equipment to normal production. Preferably, a controller monitors operating conditions of the system and automatically releases the cooling plug based on the monitored operating conditions.

9 Claims, 5 Drawing Sheets

PIPE EXTRUDING SYSTEM WITH COOLING PLUG SEPARATION

FIELD OF THE INVENTION

The present invention is directed to extrusion systems and methods for extruding plastic pipe and in particular is directed to systems and methods where a cooling plug is separable from the extrusion equipment.

BACKGROUND OF THE INVENTION

Extrusion equipment for the manufacture of plastic pipe is well known and used for forming pipe of different cross sections and diameters. For high strength plastic pipe, the pipe wall has multiple sections to improve the performance of the pipe with respect to radial compressive forces or to meet other design criteria. For buried pipe installations, the most common failure mode is inward buckling. Various forms of corrugated double wall pipe, ribbed pipe, as well as varying shaped solid wall pipes, are available for different applications. Double walled corrugated pipe is available in different diameters and is commonly used for drainage and other applications.

Pipe molding equipment includes an extruder in combination with a corrugator or moving mold block system to define a moving mold tunnel. The extruder includes an extrusion head that cooperates with the mold blocks to determine the shape of the pipe. Examples of such systems are shown in our U.S. Pat. Nos. 5,516,482; 6,155,813; 6,054,089 and 6,399,002.

The moving mold tunnel includes cooperating pairs of driven mold blocks that form a portion of the moving mold tunnel upstream of the extrusion head and move downstream of the extrusion head until the extruded plastic has cooled sufficiently to maintain its shape. The mold blocks then separate from the pipe and return to an initial position. The mold blocks are commonly connected to an endless drive conveyor to form opposed mold block trains. The mold blocks can also be driven to form a pulsating corrugator (see our U.S. Pat. Nos. 6,905,325 and 7,104,777). Various arrangements for forming a moving mold tunnel are commonly used in single and double wall pipe manufacture.

With the manufacture of large diameter pipe having a diameter of 50 cm or greater, the speed of the moving mold tunnel is relatively slow and the mold blocks defining the mold tunnel have considerable mass. The manufacture of large diameter pipe requires a high capacity extruder to provide sufficient plastic for forming the pipe. A sudden shutdown of the extrusion system is difficult as the high pressure molten plastic of the extruder is difficult to stop and commonly extrudes into and fills any voids between the mold blocks and the cooling plug which voids under normal operation would be empty.

This excess plastic can damage the molding system and/or significantly complicate the steps necessary to return the system to an operating mode.

In a sudden unexpected shutdown of a molding system for large diameter pipe, the high pressure and output of the extruder is partially offset by the excess plastic filling and setting in the mold block cavities between the mold blocks and the cooling plug. If this excess plastic sets it adheres to or binds with the cooling plug and mold blocks often preventing further movement of the moving mold tunnel. In many cases, the mold blocks must be removed from the associated drive arrangement and the set plastic removed from the mold blocks and cooling plug. This is a time consuming, labor intensive process that significantly impacts the manufacturing cost and associated loss in production time and/or production capacity.

The present invention is directed to a system and method that alleviates a number of these problems.

SUMMARY OF THE INVENTION

A molding system for the manufacture of pipe according to the present invention comprises an extruder having an extrusion head;

cooperating pairs of driven mold blocks which engage and form a moving tunnel mold about the extrusion head and move downstream thereof;

a cooling plug within the mold tunnel and releasably secured to the extrusion head by a release mounting having a release mechanism. The release mechanism when activated allows the cooling plug to separate from the extrusion head while the cooling plug is within the mold tunnel.

In an aspect of the invention, the release mechanism is activated by a remote release activator.

In a different aspect of the invention the remote release activator is a manual switch.

In a further aspect of the invention the remote release activator is an electrical switch controlled by a controller of the pipe molding system.

According to a preferred aspect of the invention, the controller includes a series of sensors for monitoring the operating conditions of the pipe molding system for predetermined cooling plug release conditions used by the controller to activate the electrical switch and release the cooling plug.

In a different aspect of the invention, the release mounting includes a separation member that forces the cooling plug to separate from the extrusion head when the release mechanism is activated.

In yet a further aspect of the invention, the controller includes operator warning alarms that are activated based on the monitored conditions satisfying predetermined operator warning conditions.

In a different aspect of the invention, the release mechanism includes a spring biased separation arrangement that provides a force causing separation of the cooling plug from the extrusion head when the release mechanism is activated.

The present invention also includes a method of controlling a pipe molding system where the pipe molding system includes an extruder with an extrusion head, cooperating pairs of driven mold blocks forming a moving mold tunnel, and a cooling plug within the moving mold tunnel and releasably secured to the extrusion head by a release mounting. The release mounting includes a release mechanism where activation of the release mechanism allows the cooling plug to separate from the extrusion head. The method includes monitoring operating conditions of the pipe molding system; comparing the monitored conditions to a predetermined set of conditions used to determine a release condition; and based on a release condition being determined activating the release mechanism to allow the cooling plug to separate from the extrusion head.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
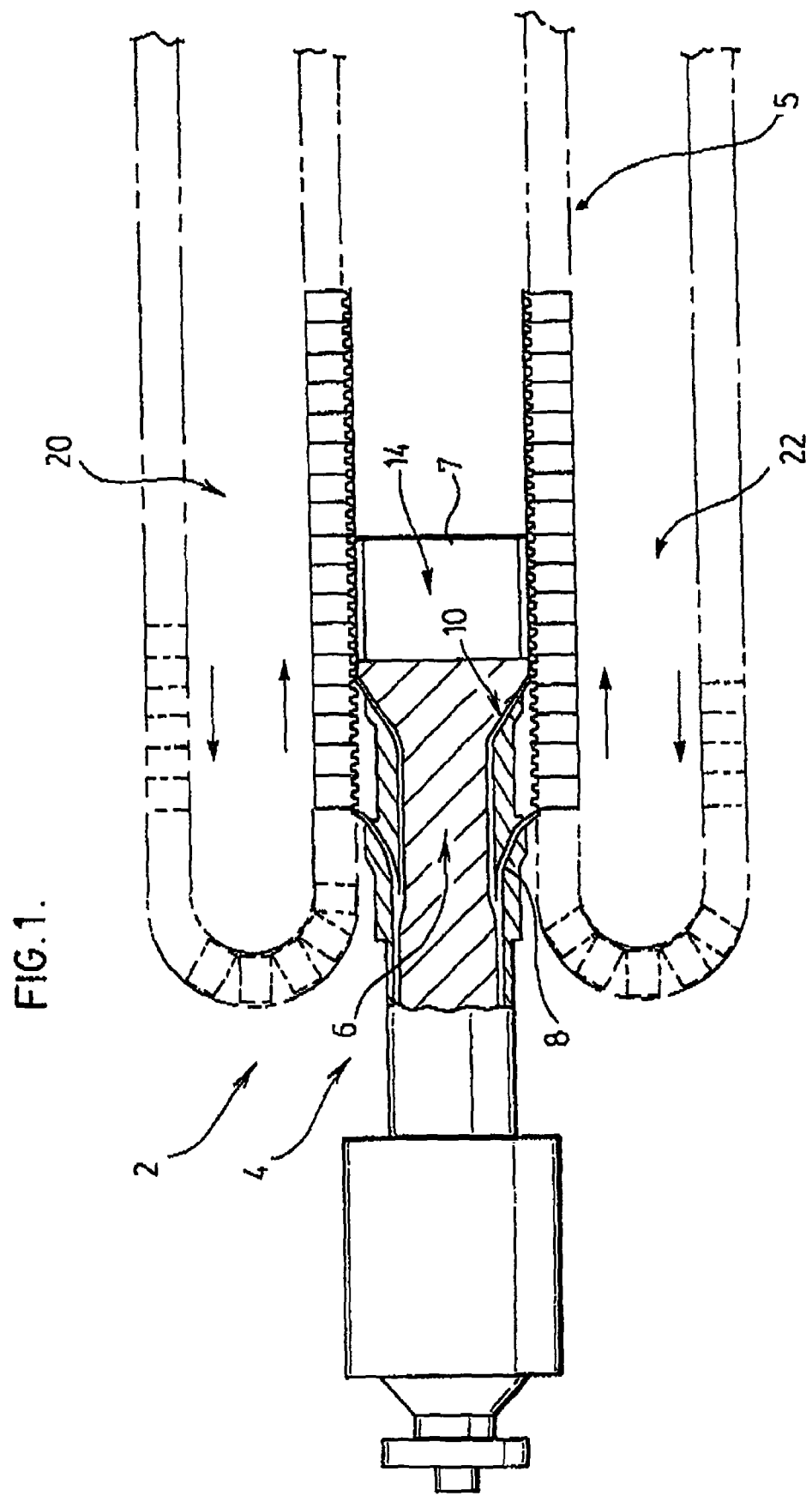
FIG. 1 is a partial schematic view of a pipe molding system.

The pipe molding system 2 includes an extruder 4 having an extrusion head 6. The cooling plug 14 is attached at an end 7 of the extrusion head 6 and cooperates with the train of mold blocks 20 and 22 that collectively define a moving mold tunnel 5. The extrusion head and the mold blocks determine the shape of the pipe being manufactured. Molten plastic is forced through the first passage 8 in the extrusion head and passes through orifice 9 to be drawn into and form the outer wall of the corrugated pipe. A second stream of plastic is forced through passage 10 and exits through orifice 11 to form the inner wall of the double walled pipe. Various arrangements for the extrusion head, as well as the mold blocks 20 and 22 forming the moving mold tunnel 5, can be used. It can also be appreciated that other types of high strength plastic pipe can also be produced such as ribbed pipe, triple walled pipe, for example. Therefore, FIG. 1 is shown as one example of the components that define the molding system 2.

Figure 2:
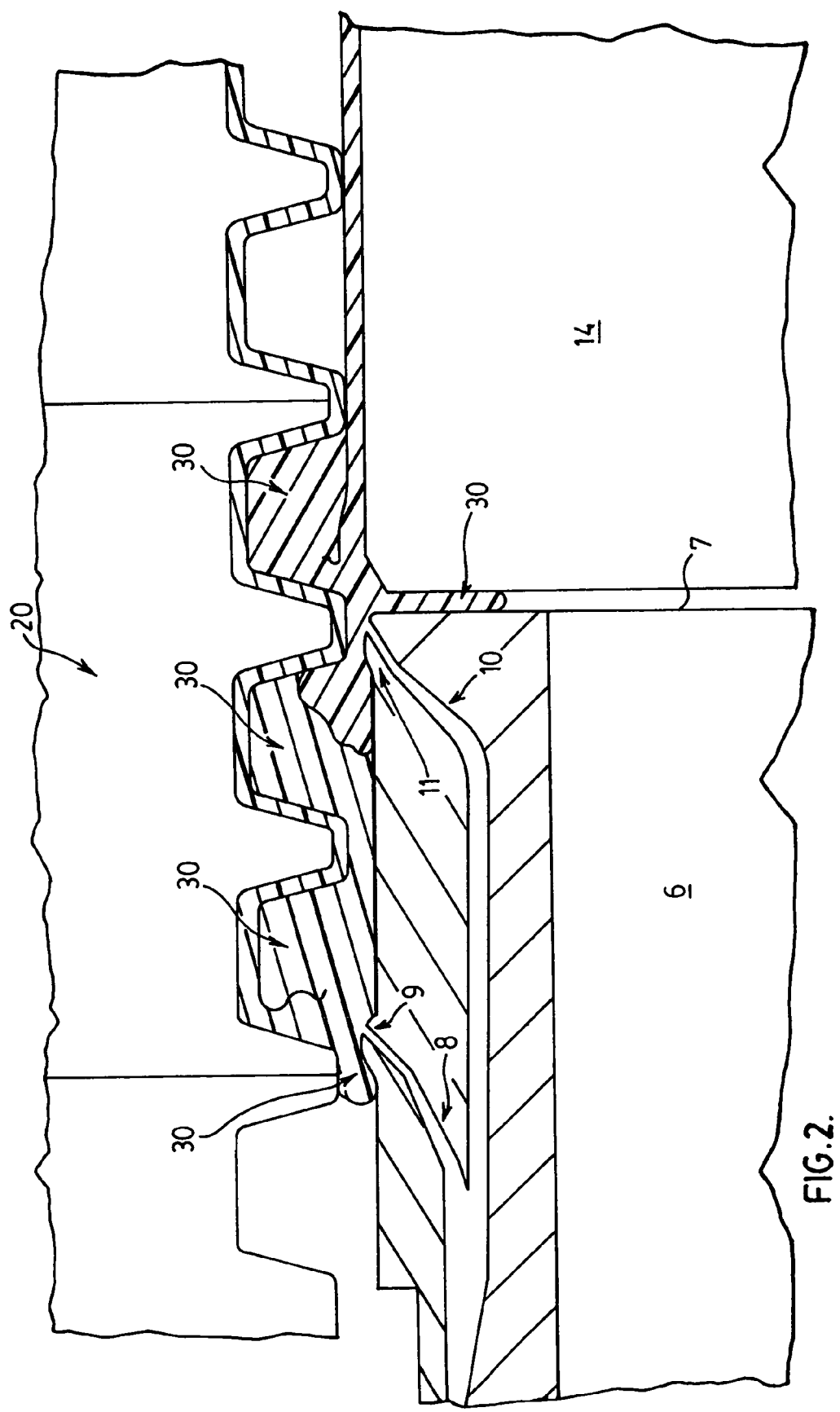
FIG. 2 is a partial sectional view of the extrusion head, mold blocks and cooling plug of the extruder.

Additional details of the extrusion head 6 and the cooling plug 14, and the cooperation with the cycling mold blocks 20, are shown in the sectional view of FIG. 2. In this case, the molding system was suddenly stopped and excess plastic due to the high pressure in the extruder has continued to extrude through the extrusion head with this excess plastic filling a number of the cavities in the cycling mold blocks 20. This excess plastic, generally shown as 30 has also moved partially upstream of the first plastic extrusion orifice 9. The high pressure of the molten plastic within the extruder together with a sudden stoppage of the moving mold tunnel create this overfill condition.

In the example shown in FIG. 2, the plastic within extruder 6 continues to flow to relieve pressure and this extra plastic has filled the cavities of the mold blocks. Once the plastic sets, the excess plastic adheres to the various surfaces and effectively locks the mold blocks in a fixed position relative to the extrusion head 6 and the cooling plug 14. If the equipment was suddenly stopped and this excess plastic 30 sets, the corrugator typically requires disassembly to remove the blockage. In many cases, the mold blocks must be separated from the extruder and extensive service of the extrusion head, cooling plug and mold blocks is required. A significant loss in production time and/or production capacity occurs. Furthermore, excess plastic pressure can damage the corrugator and/or the extrusion equipment.

Figure 3:
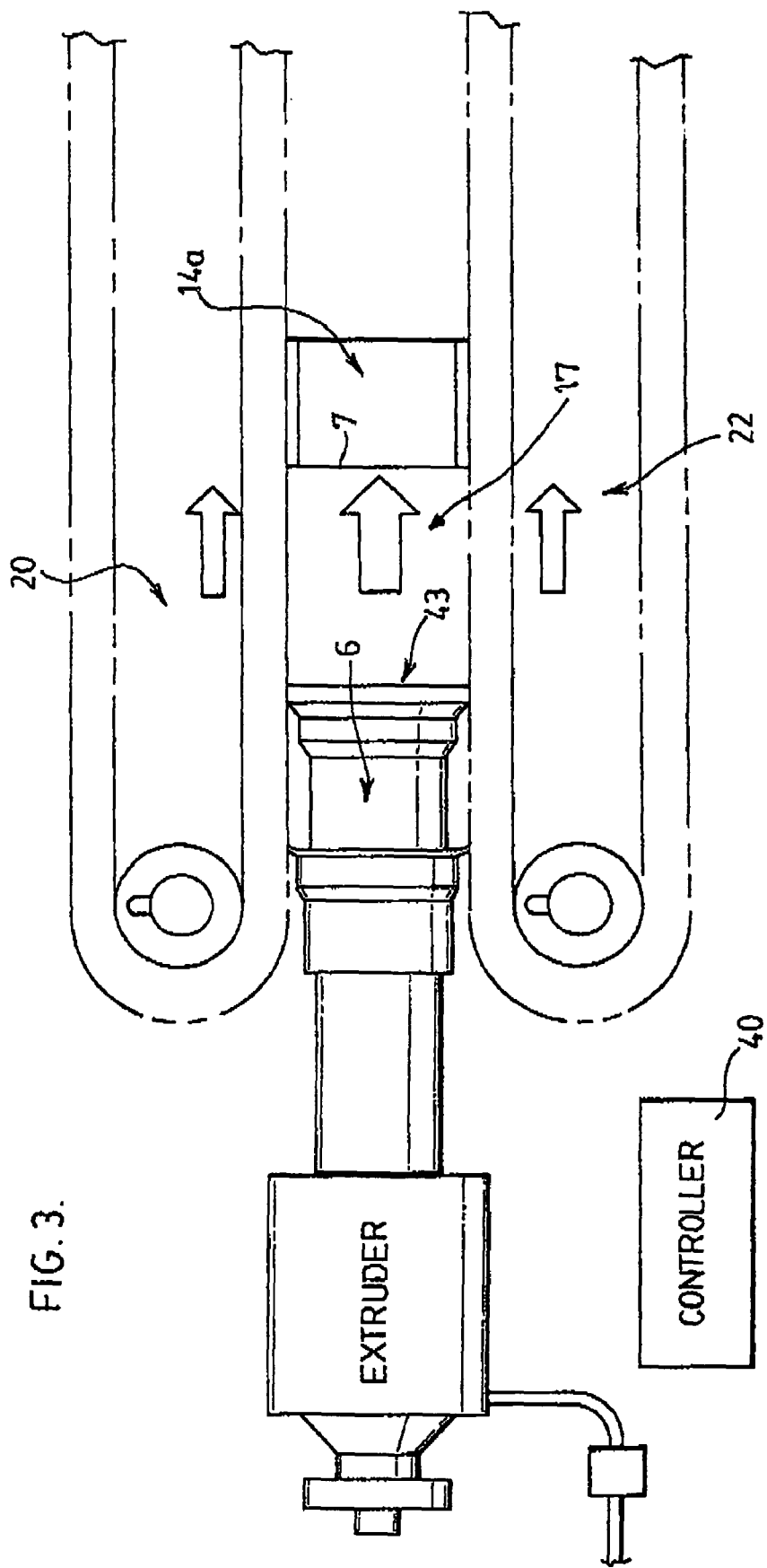
FIG. 3 is a schematic view of the molding apparatus with a cooling plug secured to the extrusion head to allow automatic separation of the cooling plug in response the detection of certain operating conditions.

In FIG. 3, the cooling plug 14 includes a release mounting 43 allowing the cooling plug to separate and release from the extrusion head 6 to create a cavity or void 17 between the cooling plug and the extrusion head where excess plastic can accumulate during a sudden shutdown or line stoppage. The release mounting 43 is controlled by controller 40. The controller 40 preferably monitors various operating conditions of the pipe molding system 2 for general operating conditions as well as stoppage conditions (sudden shutdown conditions) that may occur. For example, the controller 40 can monitor for an overload condition caused by excessive extruder output, drive overload conditions associated with the drives of the mold block trains, stall conditions, power failure conditions and/or emergency shutdown conditions. In a simplified embodiment the controller is a manual switch that is selectively activated by the operator.

Particularly, in the manufacture of large capacity pipe, the extruder output is high and difficult to stop quickly. The controller 40 monitors the operating conditions of the pipe molding system 2 for unexpected stoppage conditions that could damage the equipment and/or create significant delays in returning the system to normal manufacturing mode. The controller 40 can include operator warnings with respect to potential stoppage conditions but many of these conditions are unexpected and require immediate response to avoid or minimize additional equipment or maintenance problems. The controller, upon recognizing an unexpected stoppage condition requiring immediate shutdown stoppage, performs the necessary steps and additionally activates the release mechanism of the cooling plug. Excessive pressure of the molten plastic is dissipated as the cooling plug 14a has separated from the extrusion head 6 creating a void 17 for receiving excess molten plastic. In the embodiment shown in FIGS. 6 and 7, the release mounting also includes a bias arrangement for automatically separating the cooling plug 14a from the extrusion head 6 and thereby creating the void 17.

With this arrangement, the operator, after an unexpected stoppage of the system, can reactivate the drive of the mold block trains to move any excess plastic and the cooling plug to the downstream end of the moving mold tunnel.

The cooling plug 14a can be removed from the excess plastic and the portion of the plastic pipe about the cooling plug. This operation is relatively straightforward to carry out. Essentially the pipe molding system 2 is cleared of the blockage and can be returned to production mode in an expeditious manner.

Figure 4:
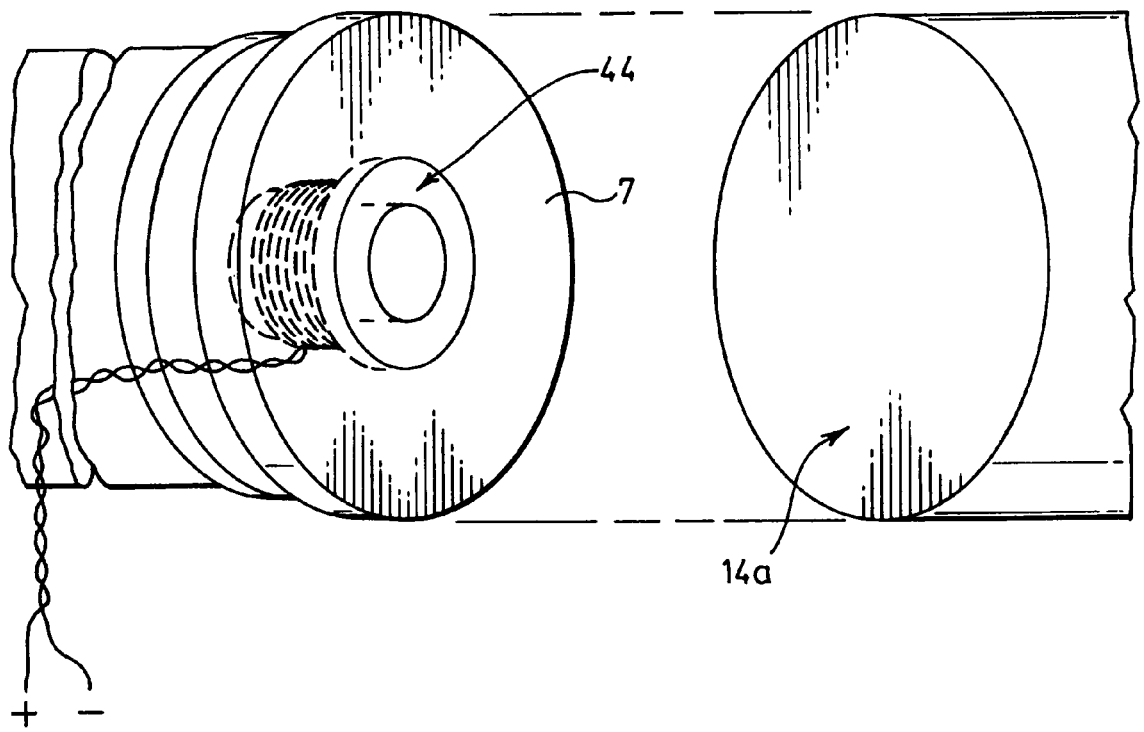
FIG. 4 is a partial perspective view of one embodiment for controlling the automatic separation of the cooling plug from the extrusion head.
Figure 5:
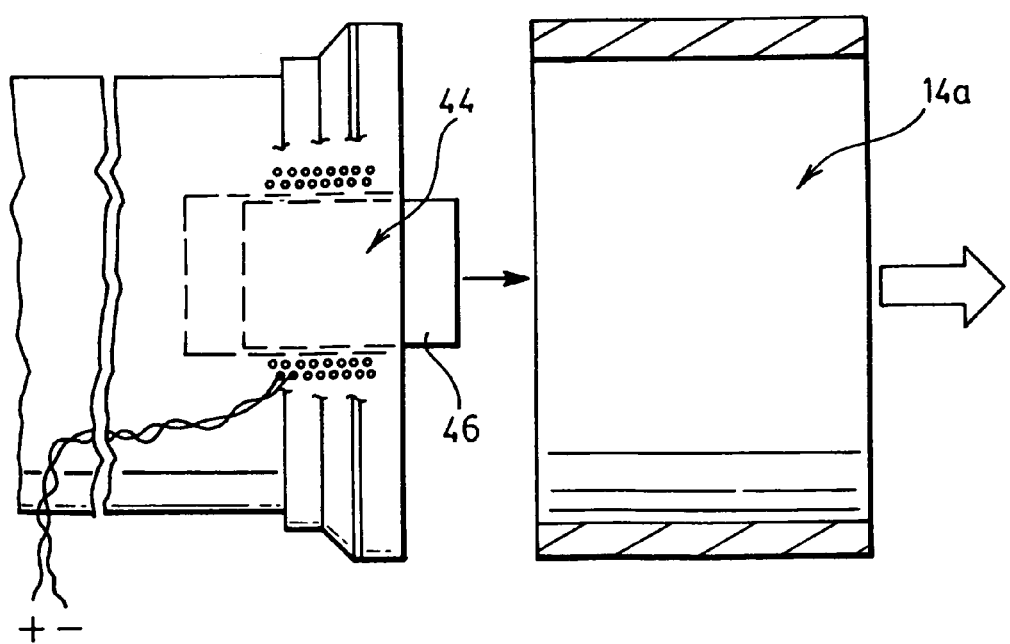
FIG. 5 is a sectional view illustrating separation of the cooling plug from the extrusion head.

The partial perspective view of FIG. 4 illustrates the extrusion head 6 having a solenoid type separator 44. The piston ram 46 is shown in a retracted position in FIG. 4, and in a release position in FIG. 5. Basically, the solenoid 44, when power is provided to the system, causes the piston ram 46 to be retracted within the extrusion head. The cooling plug 14a can be brought into abutment with the extrusion head and is maintained in position adjacent the extrusion head. When power is interrupted, the piston ram 46 automatically moves and separates the cooling plug from the extrusion head as illustrated in FIG. 5. The separation of the cooling plug creates the molten plastic receiving void 17 between the cooling plug and the extrusion head.

The pressure of the excess molten plastic can also assist in separation of the cooling plug. When the pipe molding equipment is subsequently activated, there will be a significant section of the pipe that needs to be removed. Basically, the cooling plug is moved downstream with the mold blocks to clear the moving mold tunnel. The pipe with the cooling plug therein, is readily accessible and the cooling plug is removed from the pipe and reassembled to the extrusion head. This process is simplified as the moving mold tunnel has been cleared. The removal of the cooling plug at the downstream end of the corrugator greatly simplifies the steps and time required to return the system to production mode. The mold blocks which were most exposed to the excess plastic can also be inspected and cleared at the downstream end. As can be appreciated it may be more time effective to install a replacement cooling plug and service the original cooling plug after production has been resumed.

Figure 6:
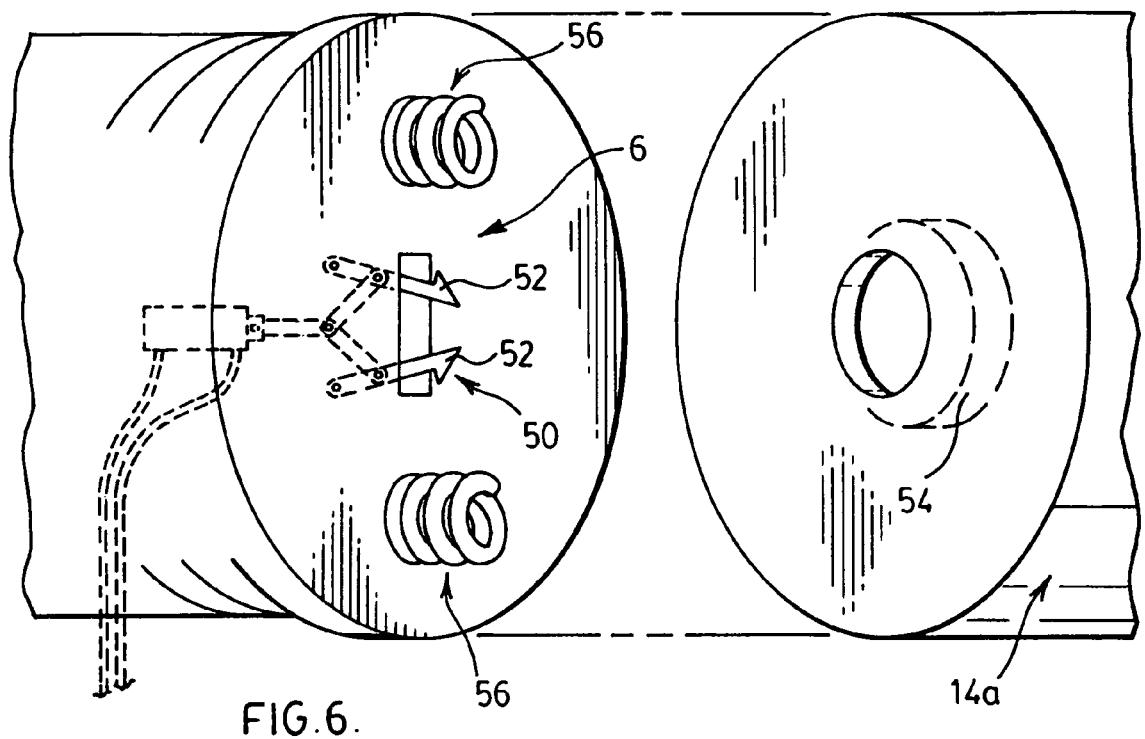
FIG. 6 is a partial perspective view showing an alternate arrangement for releasably securing the cooling plug to the extrusion head to allow automatic separation of the cooling plug in response to certain detected operating conditions.
Figure 7:
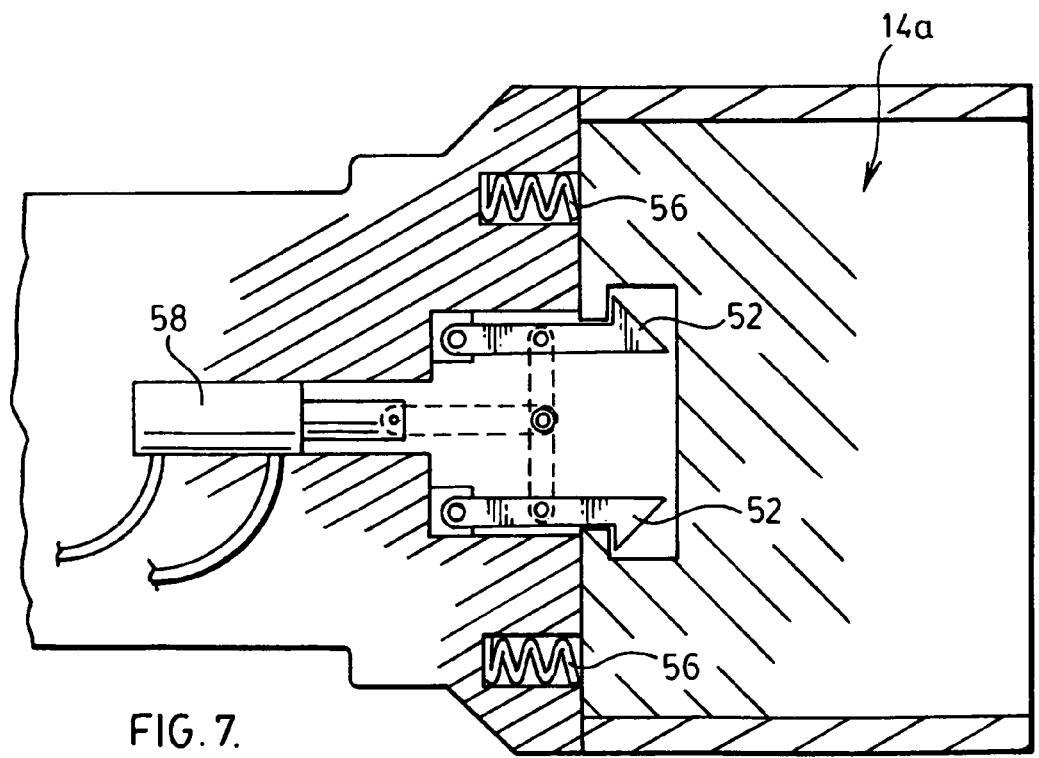
FIG. 7 is a sectional view of the arrangement of FIG. 6 in a pipe forming mode configuration.

A mechanical mechanism for securing of the cooling plug 14a to the extrusion head is shown in FIGS. 6 and 7. The lock linkage 50 includes pivoting lock members 52 that cooperate and engage the fastening lip 54 of the cooling plug. Separating springs 56 are provided between the cooling plug and the extrusion head and are compressed and are held in a compressed state during the normal operation of the molding equipment. Basically, with the mechanical lock linkage 50 in the engagement position as shown in FIG. 7, the cooling plug 14a is held in engagement with the extrusion head. Power is provided to the piston actuator 58 to maintain the secured position of FIG. 7. When a power failure occurs, the mechanical lock linkage is essentially free to release and the separating springs 56 force the cooling plug 14a to separate from the extrusion head.

Other arrangements for allowing the automatic separation of the cooling plug from the extrusion head at the time of a power interruption, or other condition can be used. The controller 40 can also include a time delay, if desired, before separation occurs. Such a time delay can vary based on the operating conditions of the extruder at the time of shutdown and/or after shutdown. It is preferable to alleviate excess pressure or excess molten plastic by separating the cooling plug to create additional space at the junction between the cooling plug and the extrusion head. This feature alone can act to prevent damage, particularly to the mold blocks and drive arrangement of the corrugator caused by excessive pressure.

This system of a releasable cooling plug can also be used with a manual switch accessible to the operator. The operator can use the manual switch to activate the release mounting and allow separation of the cooling plug from the extrusion head.

Furthermore, the cooling plug separation arrangement significantly simplifies the steps required to return the pipe molding system to normal production. For example, if the plastic has set and the cooling plug has separated, excess plastic will have accumulated and set in the gap between the extrusion head and the cooling plug. The mold blocks can be slowly advanced moving the cooling plug and the plastic blockage downstream of the extrusion head and clear of the moving mold tunnel. The cooling plug may then be removed and reinstalled in the cleared moving mold tunnel.

Although various preferred embodiments of the present invention have been described herein in detail, it will be appreciated by those skilled in the art, that variations may be made thereto without departing from the scope of the appended claims.

The embodiments of the invention in which an exclusive property or privilege is claimed are defined as follows:

1. A molding system for the manufacture of pipe comprising
   an extruder having an extrusion head;
   cooperating pairs of driven mold blocks which engage and form a moving tunnel mold about said extrusion head and move downstream thereof;
   a cooling plug within said mold tunnel and releasably secured to said extrusion head by a release mounting having a release mechanism, said release mechanism when activated allowing said cooling plug to separate from said extrusion head while said cooling plug is within said mold tunnel during operation of said molding system.

2. A molding system as claimed in claim 1 wherein said release mechanism is activated by a remote release activator.

3. A molding system as claimed in claim 2 wherein said remote release activator is a manual switch.

4. A molding system as claimed in claim 2 wherein said remote release activator is an electrical switch controlled by a controller of said pipe molding system.

5. A molding system as claimed in claim 4 wherein said controller includes a series of sensors for monitoring operating conditions of said pipe molding system, said controller monitoring said operating conditions for predetermined cooling plug release conditions used by said controller to activate said electrical switch and release said cooling plug.

6. A molding system as claimed in claim 1 wherein said release mounting includes a separation member that forces said cooling plug to separate from said extrusion head when said release mechanism is activated.

7. A molding system as claimed in claim 5 wherein said controller includes operator warning alarms that are activated based on said monitored operating conditions satisfying predetermined operator warning conditions.

8. A molding system as claimed in claim 6 wherein said separation member is a spring member.

9. A molding system as claimed in claim 4 wherein said release mechanism includes a spring biased separation arrangement that provides a force causing separation of said cooling plug from said extrusion head when said release mechanism is activated.

* * * * *